United States Patent [19]

Cisneros

[11] Patent Number: 5,777,988
[45] Date of Patent: Jul. 7, 1998

[54] SYSTEM AND METHOD FOR EQUALIZING DELAY IN A DYNAMIC PACKET SWITCHING NETWORK

[75] Inventor: Arturo Cisneros, Lincroft, N.J.

[73] Assignee: Bell Communications Research, Inc., Morristown, N.J.

[21] Appl. No.: 632,813

[22] Filed: Apr. 17, 1996

[51] Int. Cl.$^6$ ........................................ H04L 12/56
[52] U.S. Cl. ....................... 370/238; 370/252; 370/396
[58] Field of Search ................................ 370/230, 231, 370/232, 235, 236, 237, 238, 252, 253, 389, 395, 400, 412, 428, 429, 465, 516, 517, 519, 396, 397, 409

[56] References Cited

U.S. PATENT DOCUMENTS

| | | | |
|---|---|---|---|
| 4,817,085 | 3/1989 | Deprycker | 370/252 |
| 4,849,968 | 7/1989 | Turner | 370/232 |
| 5,029,164 | 7/1991 | Goldstein et al. | 370/396 |
| 5,050,161 | 9/1991 | Golestani | 370/396 |
| 5,050,162 | 9/1991 | Golestani | 370/396 |
| 5,193,151 | 3/1993 | Jain | 395/200.67 |
| 5,233,604 | 8/1993 | Ahmadi et al. | 370/400 |
| 5,381,404 | 1/1995 | Sugano et al. | 370/238 |
| 5,381,408 | 1/1995 | Brent et al. | 370/517 |

*Primary Examiner*—Alpus H. Hsu
*Attorney, Agent, or Firm*—Joseph Giordano; David A. Hey; Loria B. Yeadon

[57] ABSTRACT

A system and method for equalizing delay in a dynamic packet switching network using transmit and receive buffers. The network includes a plurality of user access stations each equipped with a transmit buffer and a receive buffer, and a plurality of switches and communication links interconnecting the user access stations. A control station having communication links to the switches and user access stations operates to set up and change transmission paths between the user access stations, and to control the buffers in the user access stations to equalize packet transmission delay through the network and to eliminate packet rate doubling upon changing transmission paths. The system also includes a buffer shifting feature whereby a controlled buffering in a transmitting user access station is gradually shifted to a buffer in a receiving user access station during a period of time following a change from a longer transmission path to a shorter transmission path.

30 Claims, 6 Drawing Sheets

SYSTEM AND METHOD FOR EQUALIZING DELAY IN A DYNAMIC PACKET SWITCHING NETWORK

BACKGROUND OF THE INVENTION

1. Field of the Invention

The present invention relates generally to routing and transferring data and, in particular, to a system and method for equalizing delay in a dynamic packet switching network that routes and transfers data in addressed packets.

2. Description of the Related Art

Telecommunication networks exist that interconnect large numbers of user stations using telecommunication facilities. These networks utilize transmission systems, switching systems, and station equipment to transmit voice, video, and data between two points. The physical circuits between two points in the network are referred to as links, and the points of junction of the links are referred to as nodes. The user stations in data transmission networks may be telephones, terminals, printers, facsimile units, computers, and the like.

Packet switching networks were designed to provide a more efficient method of transferring data over networks. However, packet switching networks can also be used to transmit digitized voice. A network that uses packet switching as a means of transmitting data is commonly referred to as a packet switching data network (PSDN).

A packet is a discrete unit of a data message that is routed individually over a PSDN. Each packet contains control information that enables the message to be reassembled in proper sequence before it reaches its final destination. Packet switching is efficient because packets occupy the channel or path through the network only for the brief time they are in transit, in contrast to a circuit-switched message, which requires the use of the transmission line for the duration of the message. On completion of the data transmission, the channel or path is made available for transfer of other packets. The transmission lines through the PSDN are supplemented with computerized switches that control traffic routing and flow. A standard feature of packet switching is automatic error detection and correction of transmitted packets.

Figure 1:
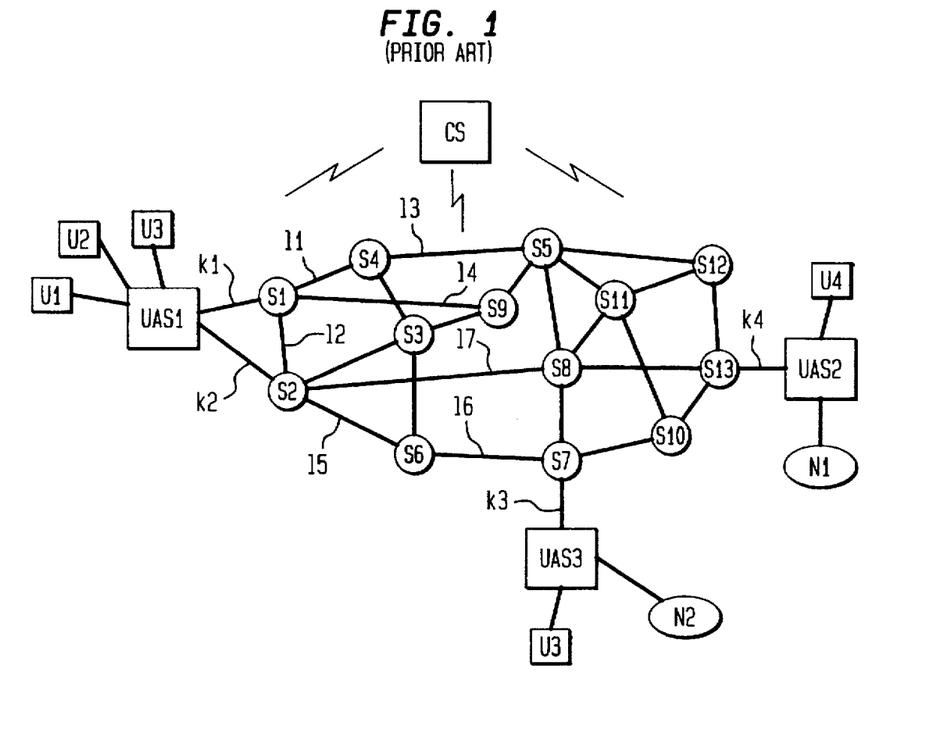
FIG. 1 is a schematic diagram providing a general overview of a conventional dynamic packet switching data network.

A conventional communications network using data packet switching is shown diagrammatically in FIG. 1. Users and other networks access this network through user access stations ("UAS"), shown, for example, in FIG. 1 as $UAS_1$, $UAS_2$, and $UAS_3$. Other networks $N_1$, $N_2$ are considered to be like other users. User access stations send user data to the network and receive user data from the network through one or more switches $S_j$. Paths are established through the network of switches $S_j$ in order to set up virtual communication channels between users on different user access stations. The transmissions delay for a data packet to go from one UAS to another UAS depends on the particular path chosen.

A typical transmission delay time through the network will be referred to as T. For example, T could be 20 milliseconds. The longest path chosen for a virtual connection through the network in a typical case has a transmission delay of 10 T. For example, for T=20 milliseconds, 10 T=200 milliseconds.

Data packet size need not be constant. Data packet size can be fixed, as it is in ATM networks. However, it must be no longer than a maximum length. The maximum packet length is such that the latency time to transmit the packet over any of the links $k_i$ or $l_y$ is smaller than T/10. The links $k_i$ are those connecting the user access stations to the switches, and the links $l_y$ are those connecting switches to other switches.

Some packet switching data networks are dynamic in a number of ways, for example, a network of packet switches on satellites in non-earth synchronous orbits. The communication links $k_i$ between the user access stations UAS and the switches $S_j$ are not permanent. Links $k_i$ are alive for a typical period of time of about 15,000T (for example, 5 minutes for T=20 milliseconds). When old links $k_i$ are removed, new ones are established, but the new links $k_i$ are almost always established on a new switch $S_j$. For example, when link $k_2$ (FIG. 1) is removed a new link between $UAS_1$ and $S_2$ may be established. There is always at least one link between a UAS and a network switch $S_j$.

The links $l_y$ between switches $S_j$ are not permanent; they have typical lifetimes of about 30,000 T (for example, 10 minutes for T=20 milliseconds). However, the pattern of links must satisfy certain conditions. There are always enough links to allow any UAS to communicate to any other UAS. Some of the links $k_i$ or $l_y$ may be permanent or much longer lived than stated above.

In a typical system, there are control stations CS having communication links to the network switches $S_j$. Their function is to control the network and to set up and tear down virtual connections. Any user access station UAS can always communicate with at least one control station CS. The location of the control stations CS are not germane to the present invention. It will be assumed that the network interconnection pattern (links $k_i$ and $l_y$) is predictable and can be computed by the control stations CS for any future time. In practice, all that is needed is the ability to compute the pattern into the future for the duration of the longest virtual connection established at the present time. Malfunctions can affect the predictability, but there exist ways of handling malfunctions.

Figure 2A:
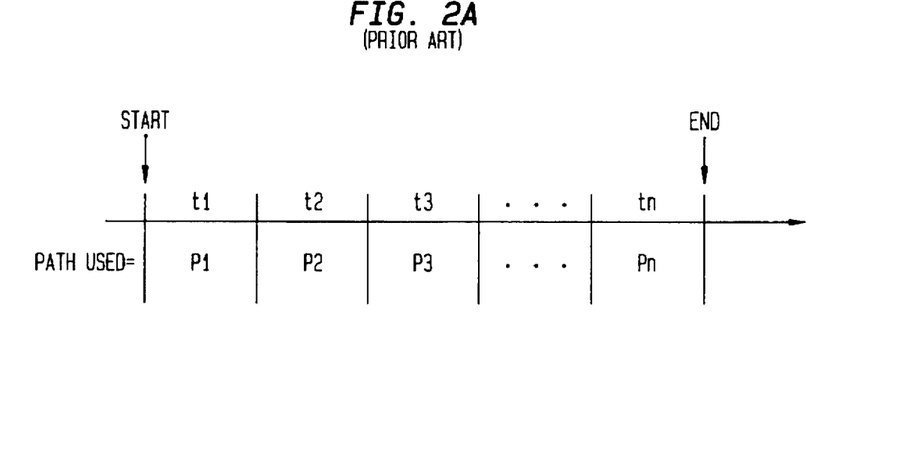
FIG. 2a illustrates an allocation of resources for a series of consecutive time intervals for a conventional dynamic packet switching data network.

A virtual connection between two network users that lasts longer than the link lifetimes must take different paths through the network during the connection lifetime. It will be assumed that the dynamic interconnection pattern (links $k_i$ and $l_y$) is such that a series of paths can be chosen for the duration of the virtual connection, and each path can be used for at least a time period 1,200 T (for example, 4 minutes for T=20 milliseconds). This is, of course, as in any other kind of network, assuming bandwidth availability. If there is not enough bandwidth available, the connection cannot be set up. Resources are reserved for the expected duration of the call. As shown in FIG. 2a, for each of a series of consecutive time intervals $t_1, t_2, t_3, \ldots, t_n$ there are corresponding paths $P_1, P_2, P_3, \ldots, P_n$, such that path $P_i$ is used during time interval $t_i$ for the virtual connection.

Figure 2B:
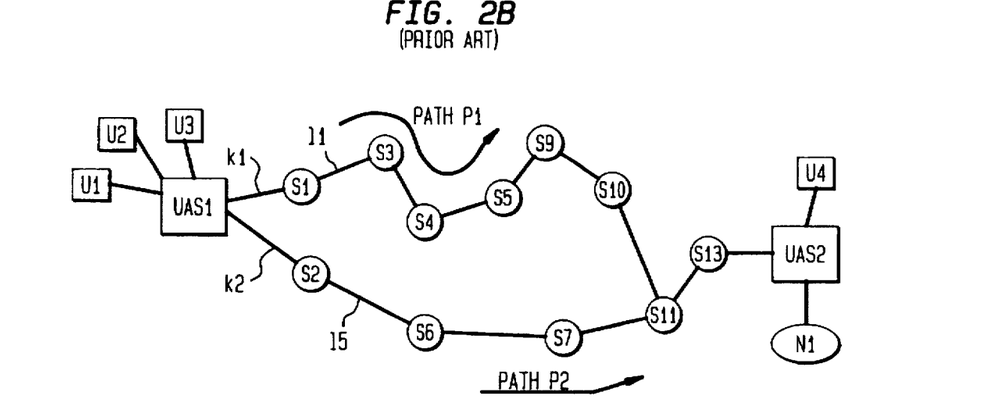
FIG. 2b is a schematic diagram depicting the paths used during two intervals (for example) in a conventional virtual connection.

Referring to FIG. 2b, a first path $P_1$, goes through switches $S_1, S_3, S_4, S_5, S_9, S_{10}, S_{11}$, and $S_{13}$, while a second path $P_2$ goes through switches $S_2, S_6, S_7, S_{11}$, and $S_{13}$. For the same virtual connection between $UAS_1$ and $UAS_2$, path $P_1$ is used during time interval $t_1$, and path $P_2$ is used during time interval $t_2$, and so forth.

Figure 3:
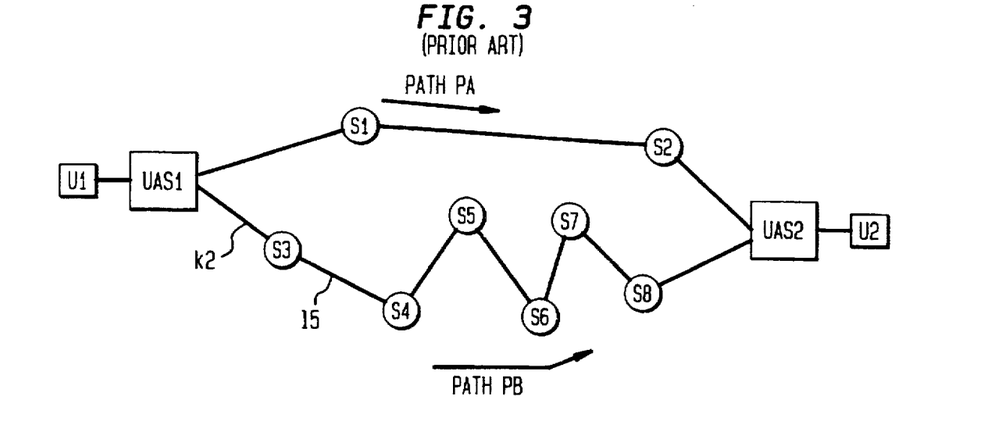
FIG. 3 is a schematic diagram showing a virtual connection that uses different paths between two users of a conventional dynamic packet switching data network.

Problems are caused by the changes in paths through the network used by one virtual connection. As shown in FIG. 3, a virtual connection is set up between user $U_1$ on $UAS_1$ and user $U_2$ on $UAS_2$. During the first time interval $t_1$, path $P_A$ is used. During the second time interval $t_2$, path $P_B$ is used. Path $P_A$ has a transmission delay time from $UAS_1$ to $UAS_2$ equal to $t_a$, while path $P_B$ has a transmission delay time from $UAS_1$ to $UAS_2$ equal to $t_b$. It should be noted that the transmission delay times $t_a$ and $t_b$ are not intervals during which paths $P_A$ and $P_B$ are used, that is given by the intervals $t_1$ and $t_2$.

It will first be assumed that $t_a<t_b$ (for example, $t_a=20$ milliseconds and $t_b=100$ milliseconds), and that there is no buffering at $UAS_2$. After the end of time interval $t_1$, the virtual connection uses path $P_B$ instead of path $P_A$. The first data packet traveling along path $P_B$ will arrive at $UAS_2$ a period of time $t_b-t_a$ later than it would have if it had gone on path $P_A$. This will leave a silent gap of duration $t_b-t_a$ in the data stream (for example, $t_b-t_a=80$ milliseconds) which is too large to be acceptable for many communication services. This problem is simple to correct, however changing from a longer path $P_B$ to a shorter path $P_A$ causes more difficult problems, as explained below.

Figure 4A:
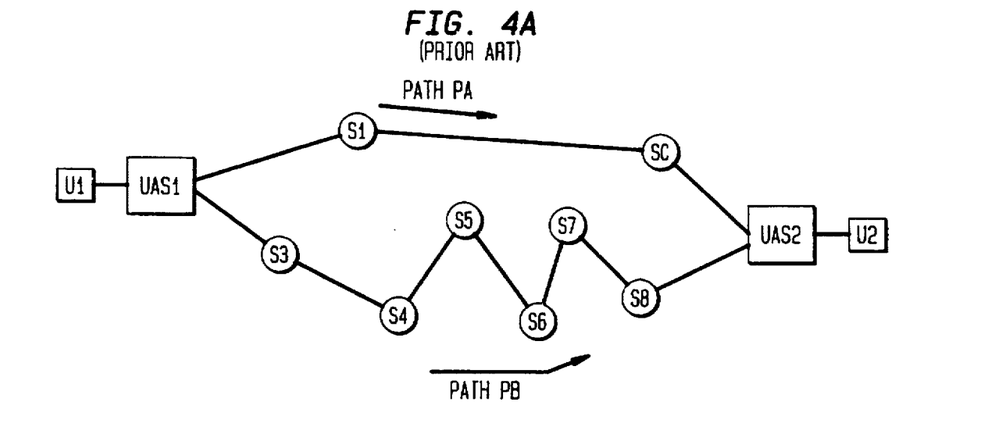
FIG. 4a is a schematic diagram showing two paths with a common switch used in a virtual connection between two users of a conventional dynamic packet switching data network.
Figure 4B:
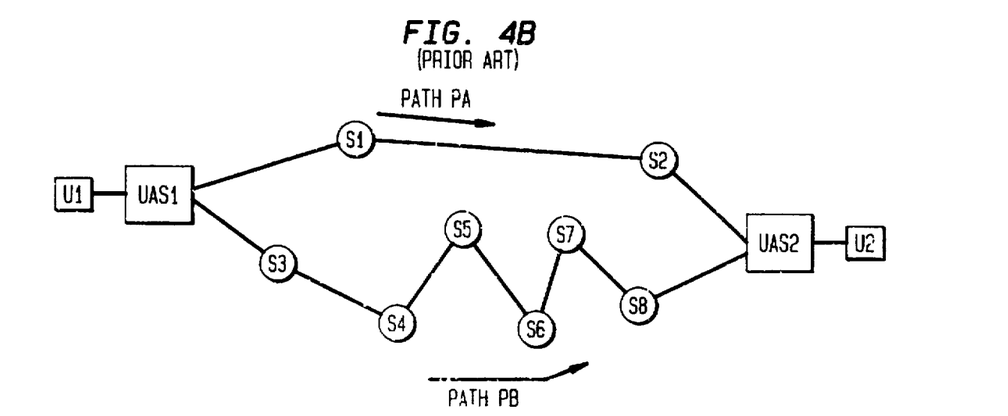
FIG. 4b is a schematic diagram showing two paths with separate links into a receiving user access station of a conventional dynamic packet switching data network.

It will now be assumed that during the first time interval $t_1$, path $P_B$ is used, and during the second time interval $t_2$, path $P_A$ is used (see FIGS. 4a and 4b). Again, $t_a$ is the transmission delay along path $P_A$, and $t_b$ is the transmission delay along path $P_B$, and $t_a<t_b$. There is no buffering at $UAS_2$ or at $UAS_1$.

Now assume that paths $P_A$ and $P_B$ have a common switch $S_C$, as shown in FIG. 4a. At the end of the time interval $t_1$, the connection will be changed from path $P_B$ to path $P_A$. When a data packet first arrives at switch $S_C$ along path $P_A$ there are earlier data packets from the connection still traveling along path $P_B$ (there is also an interpacket spacing time, but this is negligible for the problem described). There will be a period of time equal to $t_b-t_a$ during which switch $S_C$ receives packets from the connection at twice the normal rate. If the link from switch $S_C$ to $UAS_2$ is fully (or close to fully) utilized, switch $S_C$ must buffer cells from this connection for a period much longer than $t_b-t_a$. If left uncorrected, this will cause delay and possibly increase cell loss probabilities for other virtual connections (cell=data packet).

If paths $P_A$ and $P_B$ do not have a common switch, as shown in FIG. 4b, $UAS_2$ must maintain two links for a time interval $t_b-t_a$, during which time it gets cells at twice the normal rate for the connection. This will also result in an increased delay and increased cell loss probabilities for other virtual connections.

SUMMARY OF THE INVENTION

It is thus an object of the present invention to provide an improved system and method for routing and transferring data in addressed data packets, which overcomes the above-described problems in dynamic packet switching networks.

It is a further object of the present invention to provide a system and method for equalizing delay in a dynamic packet switching data network and eliminating packet rate doubling upon changing transmission paths.

Additional objects, advantages and novel features of the invention will be set forth in the description that follows, and will become apparent to those skilled in the art upon reading this description or practicing the invention. The objects and advantages of the invention may be realized and attained by the appended claims.

To achieve the foregoing and other objects and in accordance with the purpose of the present invention, as embodied and broadly described herein, the apparatus of this invention comprises a system for equalizing delay in a dynamic packet switching network, comprising a buffer means for buffering a packet transmission through the network for equalizing packet transmission delay and for eliminating packet rate doubling upon changing transmission paths through the network.

It is preferred that the buffer means comprises a first buffer means for buffering a packet transmission at a receiving user access station for equalizing packet delay through the network upon changing from one transmission path to another transmission path. The buffer means also preferably comprises a second buffer means for buffering a packet transmission at a transmitting user access station for eliminating packet rate doubling when a change is made from a longer transmission path to a shorter transmission path through the network. A means for controlling the second buffer means provides a first amount of buffering at the transmitting user access station immediately upon changing from a longer transmission path to a shorter transmission path through the network, and means for gradually shifting the first amount of buffering from the second buffer means to the first buffer means during a period of time following the change from a longer transmission path to a shorter transmission path.

In a further aspect of the present invention, in accordance with its objects and purposes, the apparatus hereof comprises a dynamic packet switching network, comprising first and second user access stations each having at least one buffer to delay packet transmission, and a network of switches and communication links interconnecting the first and second user access stations. A control station having communication links to the switches and user access stations provides means for setting up and changing transmission paths between the first and second user access stations, and means for controlling the buffers in the first and second user access stations for equalizing packet transmission delay through the network for different transmission paths.

It is also preferred that the control station have means for controlling the buffers in the first and second user access stations for eliminating packet rate doubling when a change is made from a longer transmission path to a shorter transmission path through the network. The means for controlling the buffers in the first and second user access stations comprises means for causing the buffer in the second user access station to delay packets received from the first user access station for a sufficient time to cause a total transmission delay time for each transmission path equal to a transmission delay time of a longest one of the transmission paths.

It is also preferred that the means for controlling the buffers in the first and second user access stations comprises means for causing the buffer in the first user access station to delay packets transmitted from the first user access station to the second user access station for eliminating packet rate doubling when a change is made from a longer transmission path to a shorter transmission path. The means for controlling the buffers also preferably comprises means for gradually shifting the buffering provided by the buffer in the first user access station to the buffer in the second user access station during a period of time following a change from the longer transmission path to the shorter transmission path.

In a further aspect of the present invention, in accordance with its objects and purposes, the method hereof comprises a method for equalizing delay in a dynamic packet network, comprising the steps of providing first and second user access stations each having at least one buffer to delay packet transmission, and a network of switches and communication links interconnecting the first and second user access stations, setting up and changing transmission paths between the first and second user access stations across the network of switches and communication links, and controlling the buffers in the first and second user access stations to equalize packet transmission delay through the network for all of the transmission paths.

It is also preferred that the method comprise the step of controlling the buffers in the first and second user access stations to eliminate packet rate doubling when a change is made from a longer transmission path to a shorter transmission path through the network. The method also includes the step of gradually shifting a buffering from the buffer in the first user access station to the buffer in the second user access station after changing from a first longer path through the network to a second shorter path through the network.

BRIEF DESCRIPTION OF THE DRAWINGS

The present invention will become more clearly appreciated as the disclosure of the present invention is made with reference to the accompanying drawings, wherein.

DETAILED DESCRIPTION OF THE PREFERRED EMBODIMENT

Reference will now be made in detail to a preferred embodiment of the invention, an example of which is illustrated in the accompanying drawings.

Referring to FIGS. 5a, 5b, 6a, and 6b, a system and method for equalizing data packet delay through a dynamic packet switching data network will be described. The system according to the present invention will also eliminate data packet rate doubling at a common switch along two paths used by one connection or data packet rate doubling at the receiving UAS.

Figure 5A:
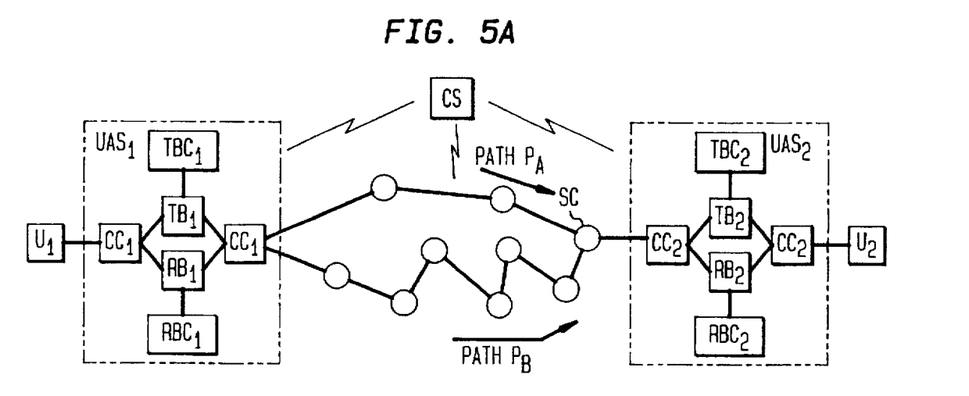
FIG. 5a is a schematic diagram of a preferred embodiment of the present invention in which a buffer system is used at each user access station to equalize delay in the network.
Figure 5B:
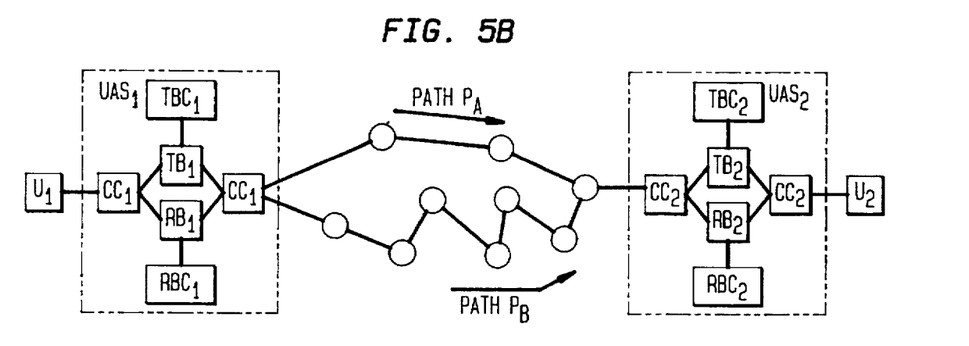
FIG. 5b is a schematic diagram of the present invention showing two paths with separate links into a receiving user access station.

As shown in FIGS. 5a and 5b, two buffers are used at each user access station UAS. A receive buffer $RB_n$ operates to delay packets so that delay is equalized to that of the longest paths used by the virtual connection. A transmit buffer $TB_n$ operates to eliminate data packet rate doubling when a change is made from one path to another shorter path. Buffer control $RBC_n$ and $TBC_n$ provide control their associated buffers $RB_n$ and $TB_n$. A control station CS having communication links to the network switches $S_j$ and the user access stations UAS functions to control the buffers and the virtual connections of the network. The communication feeds to and from the buffers $TB_n$ and $RB_n$ are combined at cross connect elements $CC_n$ in each of the user access stations. The details of the buffers and their operation in the packet network are described below.

The change of a virtual connection from a path $P_A$ to a longer path $P_B$ will be described first. The paths can have a common switch $S_C$ before the receiving user access station $UAS_2$ (FIG. 5a), or the paths can enter the receiving user access station $UAS_2$ through two links without a common switch (FIG. 5b). The connection starts, for example, using path $P_A$. Packets traveling along path $P_A$ undergo a transmission delay time $t_a$ from $UAS_1$ to $UAS_2$. When the virtual connection is moved from path $P_A$ to path $P_B$, the packets traveling along path $P_B$ undergo a transmission delay time $t_b$ from $UAS_1$ to $UAS_2$.

In order to equalize the transmission delay times for paths $P_A$ and $P_B$, packets traveling along path $P_A$ are delayed for a time $t_b-t_a$ in buffer $RB_2$. On the other hand, packets traveling along path $P_B$ are not delayed at $RB_2$. After moving the virtual connection from path $P_A$ to path $P_B$, the first packet for the connection traveling along path $P_B$ arrives at $RB_2$ after the last packet traveling along path $P_A$ leaves the buffer $RB_2$. There is no gap in the data packet stream, and transmission delay time is the same from $U_1$ to $U_2$ when paths $P_A$ or $P_B$ are used.

The change of a virtual connection from path $P_B$ to a shorter path $P_A$ will be described next. During the time the connection is using path $P_B$, the transmission delay is $t_b$, and the packets are not delayed at either $TB_1$ or at $RB_2$. When the change is made to the shorter path $P_A$, the present invention avoids packet rate doubling by delaying packets for transmission along path $P_A$ for a time $t_b-t_a$ in buffer $TB_1$. In this way, the first packet traveling along path $P_A$ will arrive at $S_C$ (FIG. 5a) or at $UAS_2$ (FIG. 5b) after the last packet traveling along path $P_B$ arrived at $S_C$ or at $UAS_2$. This eliminates data packet rate doubling and equalizes the transmission delay times for paths $P_A$ and $P_B$.

Figure 5C:
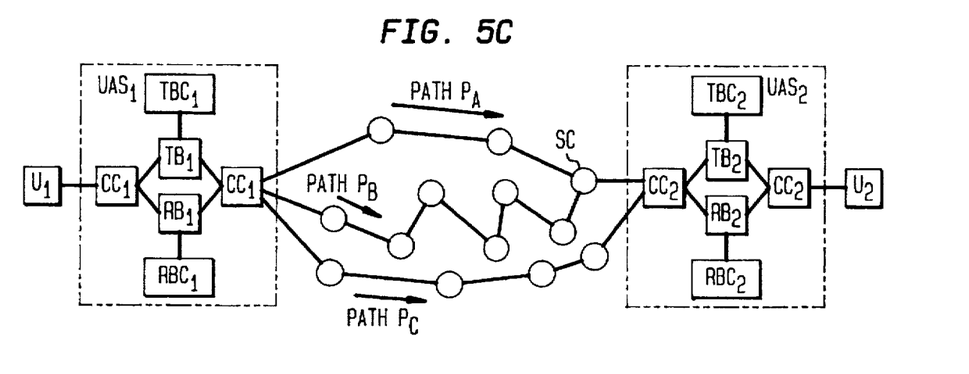
FIG. 5c is a schematic diagram of the present invention showing the delay equalizing system of the present invention used to equalize delay across three transmission paths.

Referring to FIG. 5c, the present invention will next be described for the case where a change to a new path $P_C$ longer than $P_A$ is made. Assume the connection uses paths $P_B$, $P_A$, and $P_C$ (in that order) with transmission delays $t_b$, $t_a$, and $t_c$, respectively. Also assume, as above, that $t_a < t_b$ and that $t_a < t_c < t_b$. Path $P_B$ is the path with longest delay of the three paths. When the change is made from path $P_B$ to the shorter path $P_A$ the procedure described above is used. As described, the packets are buffered and delayed for a time $t_b-t_a$ in the transmit buffer $TB_1$, but not in the receive buffer $RB_2$. If the system simply waits until the change is made from path $P_A$ to path $P_C$, there will be a gap of time $t_c-t_a$ in the packet stream, and the total delay will be $(t_b-t_a)+t_c$, which is larger than $t_b$ because $t_c-t_a$ is positive.

The problem just described is avoided by shifting the buffering of packets for the virtual connection from $TB_1$ to $RB_1$ during the time that the path $P_A$ is being used. In one example of the present invention, it will be assumed that each path can be used for a time period of at least 12,000 T (e.g., 4 minutes for T=20 milliseconds), where T is the typical transmission delay through the network. It will also be assumed that there is a maximum transmission delay of 10 T (e.g., 200 milliseconds for T=20 milliseconds) for transmission across the longest path $P_B$.

The buffering delays applied in order to equalize the total delay are equal to the transmission time differences along two paths. Buffering delays are therefore also bounded by a maximum time equal to 10 T. The average number of packets transmitted for the connection in a time 12,000 T (path $P_A$ minimum active time) is 1,200 times larger than the average number of packets transmitted in a time 10 T (maximum buffering delay). So the number of packets buffered at $TB_1$ is 1/1200 times the number of packets the virtual connection delivers during the time period 12,000 T, which is a lower bound to the period of time any one path is used, in particular, path $P_A$.

Buffering can be shifted from buffer $TB_1$ to $RB_2$ by sending packets from $TB_1$ to $RB_2$ at a rate one per thousand larger than the average for the connection. This procedure will take time $1,000(t_c-t_a)$ which is smaller than 10,000 T and also smaller than the time path $P_A$ is used. During this time packets are delayed at $RB_2$ for a time sufficient to make the total delay equal to $t_b$. At the start of the procedure packets are delayed by $t_b-t_a$ at $TB_1$ and by zero at $RB_2$. At the end of the procedure packets are delayed by zero at $TB_1$ and by $t_b-t_a$ at $RB_2$.

During the time period $1,000(t_b-t_a)$ the delay in buffer $TB_1$ changes linearly from $t_b-t_a$ to zero, and in buffer $RB_2$ the delay changes linearly from zero to $t_b-t_a$. At the end of this buffering shift, there is no delay at buffer $TB_1$, and a delay of $t_b-t_a$ at $RB_2$ thus occurs near the end of the use of the path $P_A$. When the change is made to the path $P_C$, the transmission delay is $t_c$, which is longer than $t_a$. There will now be no gap in the packet stream out of $UAS_2$ to user $U_2$. The first packet traveling along path $P_C$ will arrive at the buffer $RB_2$ a time $t_c-t_a$ later than if it had gone along $P_A$. During this time the connection to $U_2$ is fed from the buffer $RB_2$. The delay at buffer $RB_2$ will be $t_b-t_c$ for packets traveling along path $P_C$. The total transmission delay including buffering is equal to $t_b$, as mentioned above.

In order to accomplish the above delay equalizing procedure it is necessary to reserve 1/1,000 (0.1%) of the bandwidth in the network for buffer shifting.

Buffers $TB_2$ and $RB_1$ are used in an analogous way to equalize delay and eliminate gaps in the packet stream for the connection in the opposite direction. The requirement that a path must be used for at least a time 12,000 T need not apply to the last path used by the connection.

Figure 6A:
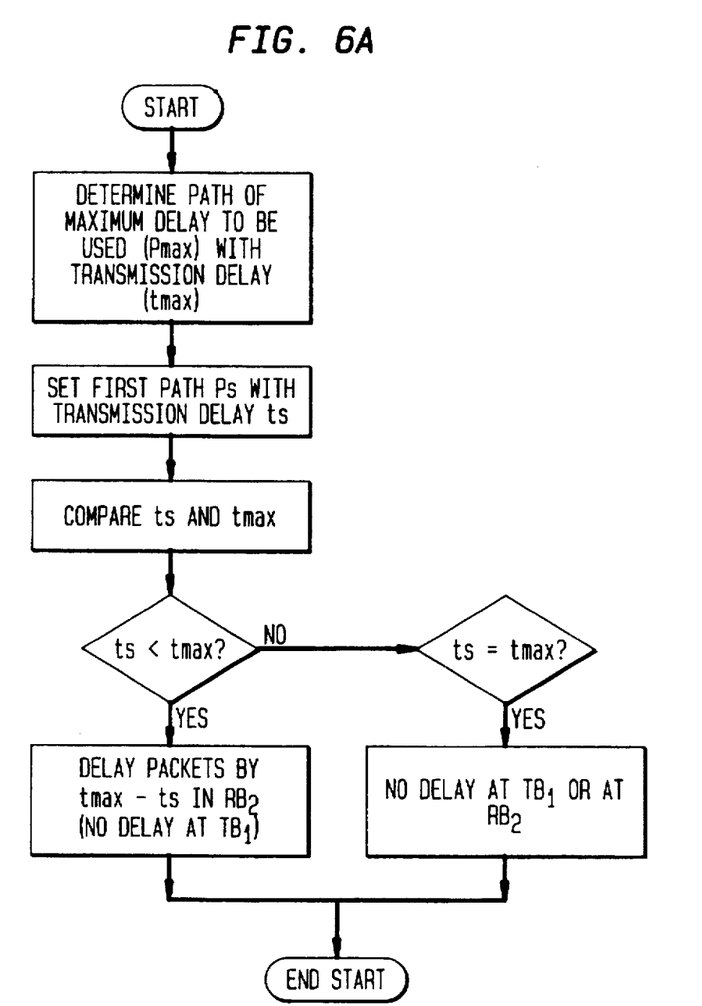
FIGS. 6a and 6b are flow charts of the process steps used by the present invention to equalize delay in a dynamic packet switching data network.
Figure 6B:
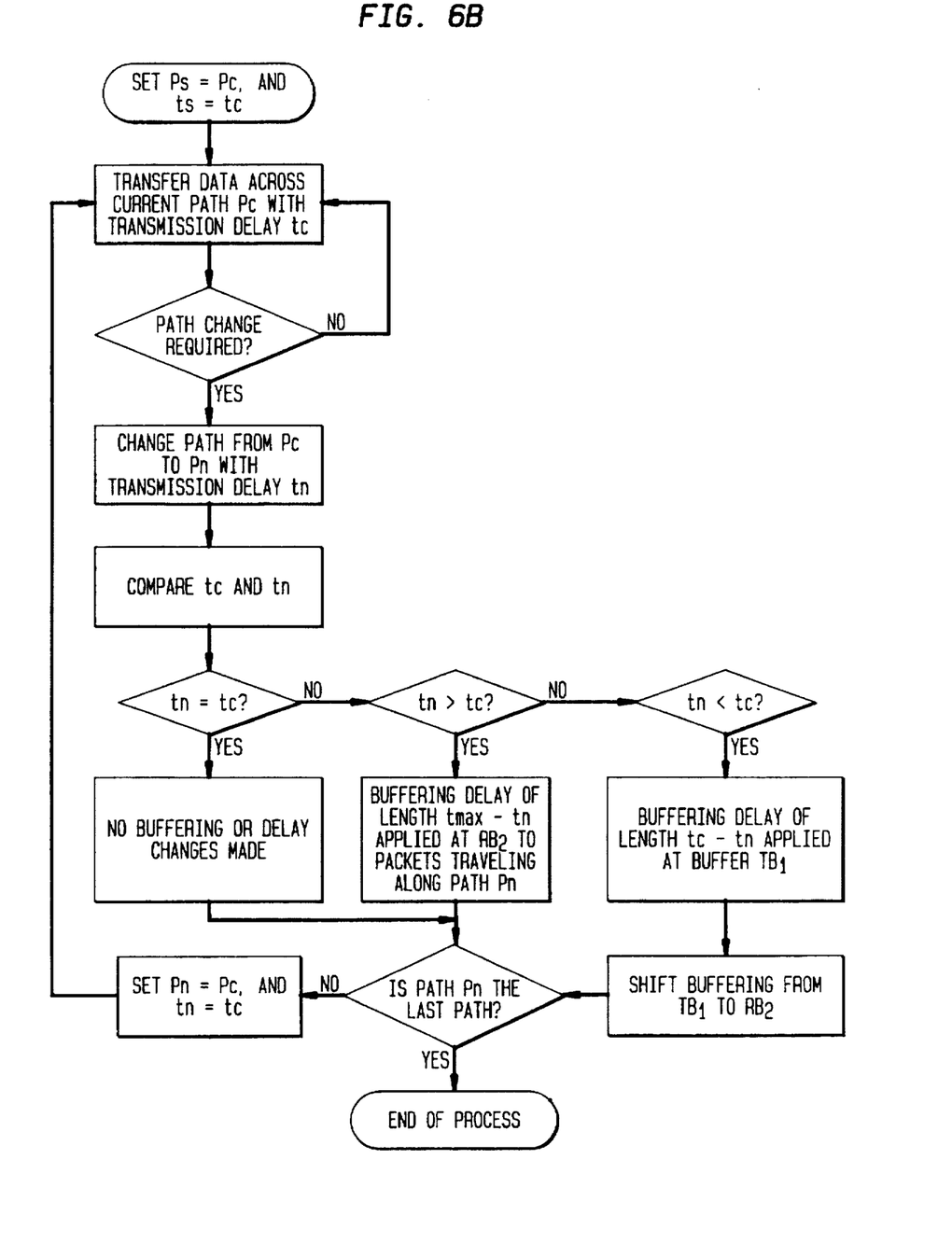

Referring to FIGS. 6a and 6b, the method for equalizing delay in a dynamic packet network according to the present invention will be further described as a series of process steps.

In FIG. 6a, the process steps for an initial start of the delay equalizing process are shown. The process starts by determining the path $P_{max}$ that will be used having the maximum time delay $t_{max}$ (e.g., $P_B$ and $t_b$ in the example above). If the duration of the data transmission is indeterminate, the system will use the upper bound for $t_{max}$. A first path $P_s$ having a transmission delay $t_s$ is then set by the control system. If $t_s<t_{max}$, the system will delay packets by $t_{max}-t_s$ in $RB_2$ with no delay at $TB_1$. If $t_s=t_{max}$, the system will not delay the packets at either $TB_1$ or at $RB_2$.

In FIG. 6b, the process steps for equalizing delay in the network upon switching paths are shown. When the time comes for a path change to be made, the buffering, if any, is at $RB_2$. The current path is $P_C$ with transmission delay $t_c$, and the new path is $P_N$ with transmission delay $t_c$. If $t_n=t_c$, no buffering or delay changes are made by the control system. However, if $t_n>t_c$, a buffering delay of length $t_{max}-t_n$ will be applied at $RB_2$ to packets traveling along path $P_N$. The buffering delay was $t_{max}-t_c$ before the change and will be $t_{max}-t_n$ after the change. If $t_n<t_c$, the control system will apply a buffering delay of length $t_c-t_n$ in the buffer $TB_1$. The system will then gradually shift the buffering from $TB_1$ to $RB_2$ using the procedure described above during the time path $P_N$ is used. At the end of the buffer shifting procedure all buffering delay will be at $RB_2$ and will be equal to $t_{max}-t_n$. The total transmission delay is always $t_{max}$.

The loop terminates during the use of the last path. If the process is in the middle of a buffer shifting procedure, there is no difficulty. The remaining packets in the network are delivered to $U_2$ with a constant delay equal to $t_{max}$.

The minimum length of time that any path (except the last) can be used can be reduced as desired. For example, if the minimum time a path must be usable is 1,200 T (instead of 12,000 T) then the buffering must be shifted from $TB_1$ to $RB_2$, when necessary, 10 times as fast. This implies sending one more packet per one hundred packets during the buffering shift process. This requires 1% of available bandwidth to be reserved for this purpose. This can be carried further if more bandwidth is made available for shifting.

It will be appreciated that the present invention is not limited to the exact construction or process steps that have been described above and illustrated in the accompanying drawings, and that various modifications and changes can be made without departing from the scope thereof. It is intended that the scope of the invention only be limited by the appended claims.

What is claimed is:

1. A system for equalizing delay in a dynamic packet switching network, comprising:

first and second user access stations for transmitting and receiving packet transmissions between users in the packet switching network, a plurality of switches between said user access stations and capable of being connected to define at least two transmission paths between said first and second user access stations;

buffer means in each of said user access stations for buffering packet transmissions through the network between said user access stations; and control means for controlling said switches to define the transmission paths, for determining packet transmission delays for said transmission paths, and for controlling said buffer means in said user access stations to equalize the packet transmission delays through the network and to eliminate packet rate doubling upon changing of transmission paths being utilized between said user access stations.

2. The system according to claim 1 wherein said buffer means at each of said user access stations comprises a receive buffer for buffering a packet transmission being received at a receiving user access station for equalizing packet delay through the network upon changing from one transmission path to another transmission path, wherein a packet transmission is delayed for a time period equal to the delay time associated with the transmission path having the maximum delay time.

3. The system according to claim 2 wherein said buffer means at each of said user access stations comprises a transmit buffer for buffering a packet transmission being transmitted at a transmitting user stations for eliminating packet rate doubling when a change is made from a longer transmission path to a shorter transmission path through the network, wherein a packet transmission is delayed for a time period equal to the difference in delay time between a longer path delay time associated with the longer transmission path and a shorter path delay time associated with the shorter transmission path.

4. The system according to claim 3 wherein said control means controls said transmit buffer to provide a first amount of buffering at the transmitting user access station immediately upon changing from a longer transmission path to a shorter transmission path through the network and gradually shifts said first amount of buffering from said transmit buffer to a receive buffer during a first period of time following the change from a longer transmission path to a shorter transmission path.

5. The system according to claim 4, wherein said shorter transmission path is used for a second period of time, and said first period of time is shorter than said second period of time.

6. The system according to claim 3, wherein a first longer path $P_B$ through the network has a transmission delay $t_b$, a second shorter path $P_A$ through the network has a transmission delay $t_a$, said transmission delay $t_b$ being greater than said transmission delay $t_a$, and wherein said control means controls said transmit buffer to provide an amount of buffering at the transmitting user access station sufficient to cause a packet transmission delay equal to the difference between $t_b$ and $t_a$ immediately upon a change being made from said first longer transmission path $P_B$ to said second shorter path $P_A$.

7. The system according to claim 6, wherein said control means shifts the buffering provided by the transmit buffer to the receive buffer during a first period of time following the change from said first longer period of time following the change from said first longer path $P_B$ to said second short path $P_A$, whereby at the end of the first period of time said transmit buffer provides an amount of buffering at the receiving user access station sufficient to cause a packet transmission delay equal to the difference between $t_b$ and $t_a$, and said transmit buffer provides no buffering at the transmitting user access station.

8. The system according to claim 7, wherein said first period of time is shorter than a total time that the second path $P_A$ is to be used.

9. The system according to claim 7, wherein said control means provides a gradual shifting of the buffering provided by the transmit buffer to the receive buffer during said first period of time.

10. A dynamic packet switching network, comprising:
a first user access station having at least one buffer to delay a packet transmission;
a second user access station having at least one buffer to delay packet transmission;
a network of switches and communication links interconnecting the first and second user access stations; and
at least one control station having communication links to the switches and user access stations, said control station controlling the setting up and the changing of transmission paths through said switches between the first and second user access stations and controlling the buffers in the first and second user access stations for equalizing packet transmission delay through the network for different transmission paths between said first and second user stations, whereby a packet transmission is delayed for a variable time period depending on the delay time for the transmission path with the longest delay time and based on relative delay times among changing transmission paths.

11. The packet switching network according to claim 10, wherein said control station further controls the buffers in the first and second user access stations for eliminating packet rate doubling when a change is made from a longer transmission path to a shorter transmission path through a network, whereby a packet transmission is delayed for a time period equal to the difference in delay time between a longer path delay time associated with the longer transmission path and a shorter path delay time associated with the shorter transmission path.

12. The packet switching network according to claim 10, wherein said at least one buffer in the first user access station comprises a transmit buffer $TB_1$ and a receive buffer $RB_1$.

13. The packet switching network according to claim 12, wherein said at least one buffer in the second user access station comprises a transmit buffer $TB_2$ and a receive buffer $RB_2$.

14. The packet switching network according to claim 10, wherein said control station causes the buffer in the second user access station to delay packets received from the first user access station for a sufficient time to cause a total transmission delay time for each transmission path equal to a transmission delay time of a longest one of said transmission paths.

15. The packet switching network according to claim 10, wherein said control station causes the buffer in the first user access station to delay packets transmitted from the first user access station to the second user access station for eliminating packet rate doubling when a change is made from a longer transmission path to a shorter transmission path.

16. The packet switching network according to claim 10, wherein a first path $P_B$ through the network has a transmission delay $t_b$, a second path $P_A$ through the network has a transmission delay $t_a$, said transmission delay $t_b$ being longer than said transmission delay $t_a$, and said control station causing said buffer in the first user access station to delay packet transmission for a time equal to the difference between $t_b$ and $t_a$ upon a change being made from said first path $P_B$ to said second path $P_A$.

17. The packet switching network according to claim 16, wherein said control station causes shifting at the buffering provided by the buffer in the first user access station to the buffer in the second user access station during a first period of time following a change from said first path $P_B$ to said second path $P_A$, whereby at the end of said first period of time the buffer in said second user access station provides an amount of delay equal to the difference between $t_b$ and $t_a$, and the buffer in the first user access station provides no delay.

18. The packet switching network according to claim 17, wherein said first period of time is shorter than a total time that the second path $P_A$ is to be used for packet transmission.

19. The packet switching network according to claim 17, wherein said control station provides for a gradual shifting of the buffering provided by the buffer in the first user access station to the buffer in the second user access station during said first period of time.

20. The packet switching network according to claim 16, wherein said first path $P_B$ and said second path $P_A$ share a common switch.

21. A method for equalizing delay in a dynamic packet network, said network having first and second user access stations each having at least one buffer to delay packet transmission and a plurality of switches and communication links configurable into at least two transmission paths interconnecting the first and second user access stations, said method comprising the steps of:
determining packet transmission delay times for transmission paths between the first and second user access stations;
setting up and changing transmission paths between the first and second user access stations through the switches and communication links; and controlling the buffers in the first and second user access stations to equalize packet transmission delay through the network for all of the transmission paths, wherein a packet transmission is delayed for a variable period of time by said buffers depending on the delay time determined for the transmission path with the longest delay time and based upon relative delay times among changing transmission paths.

22. The method according to claim 21, further comprising the step of controlling the buffers in the first and second user access stations to eliminate packet rate doubling when a change is made from a longer transmission path to a shorter transmission path through the network, wherein a packet transmission is delayed for a period of time equal to the difference in delay time between a longer path delay associated with the longer transmission path and a shorter path delay time associated with the shorter transmission path.

23. The method according to claim 21, further comprising the steps of:

determining a transmission path having a maximum delay time $t_{max}$ to be used for transmitting packets from the first user access station to the second user access station;

setting up a first path to be used for transmitting packets from the first user access station to the second user access station, the first path having a delay time $t_s$;

comparing the transmission delay time $t_s$ of the first path with the maximum delay time $t_{max}$; and buffering the packet transmission across the first path to cause a packet transmission delay in the second user access station equal to the time difference between $t_{max}$ and $t_s$.

24. The method according to claim 23, further comprising the steps of:

changing said first path to a second path to be used for transmitting packets from the first user access station to the second user access station, the second path having a delay time $t_n$;

comparing the transmission delay time $t_s$ of the first path with the transmission delay time $t_n$ of the second path; and controlling the buffers in the first and second user access stations based on the comparison between the transmission delay time $t_s$ and the transmission delay time $t_n$ to equalize packet transmission delay through the network and to eliminate packet rate doubling.

25. The method according to claim 24, further comprising the steps of:

controlling the buffer in the second user access station to cause a packet transmission delay in the second user access station equal to the time difference between $t_{max}$ and $t_n$ when the comparison between the transmission delay time $t_s$ and the transmission delay time $t_n$ indicates that $t_n$ is greater than $t_s$; and controlling the buffer in the first user access station to cause a packet transmission delay in the first user access station equal to the time difference between $t_s$ and $t_n$ when the comparison between the transmission delay time $t_s$ and the transmission delay time $t_n$ indicates that $t_n$ is less than $t_s$.

26. The method according to claim 25, further comprising the step of shifting a buffering from the buffer in the first user access station to the buffer in the second user access station after the first path through the network is changed to a second path through the network that is shorter than the first path.

27. The method according to claim 21, further comprising the step of controlling the buffer in the second user access station to delay packets received from the first user access station for a sufficient time to cause a total transmission delay time for each transmission path equal to a total transmission delay time of a longest one of said transmission paths.

28. The method according to claim 21, further comprising the steps of:

transmitting packets through the network across a first path $P_B$ having a transmission delay $t_b$;

changing the transmission path from the first path $P_B$ to a second path $P_A$, said second path $P_A$ having a transmission delay $t_a$ that is less than said transmission delay $t_b$; and controlling the buffer in said first user access station to delay packet transmission for a time equal to the difference between $t_b$ and $t_a$ upon changing the transmission path from said first path $P_B$ to said second path $P_A$.

29. The method according to claim 28, further comprising the step of shifting the buffering provided by the buffer in said first user access station to the buffer in the second user access station during a first period of time following the change from said first path $P_B$ to said second path $P_A$, whereby at the end of said first period of time the buffer in the second user access station provides an amount of buffering sufficient to cause a packet transmission delay equal to the difference between $t_b$ and $t_a$, and the buffer in the first user access station provides no buffering.

30. The method according to claim 29, wherein said shifting step comprises gradually shifting the buffering provided by the buffer in the first user access station to the buffer in the second user access station during said first period of time.

* * * * *